United States Patent
Shimoda et al.

(10) Patent No.: US 9,412,214 B2
(45) Date of Patent: Aug. 9, 2016

(54) ILLUMINATION APPARATUS, IMAGE SENSOR UNIT, AND PAPER SHEET DISTINGUISHING APPARATUS

(71) Applicant: CANON COMPONENTS, INC., Kodama-gun, Saitama (JP)

(72) Inventors: Shuuichi Shimoda, Saitama (JP); Morio Tezuka, Saitama (JP); Taiji Migita, Saitama (JP); Takahiro Kaihotsu, Saitama (JP)

(73) Assignee: CANON COMPONENTS, INC., Kodama-Gun (JP)

( * ) Notice: Subject to any disclaimer, the term of this patent is extended or adjusted under 35 U.S.C. 154(b) by 327 days.

(21) Appl. No.: 14/020,321

(22) Filed: Sep. 6, 2013

(65) Prior Publication Data

US 2014/0169656 A1 Jun. 19, 2014

(30) Foreign Application Priority Data

Sep. 7, 2012 (JP) ................................. 2012-197563
Jul. 4, 2013 (JP) ................................. 2013-141003

(51) Int. Cl.
G06K 9/00 (2006.01)
G07D 7/12 (2016.01)
F21V 8/00 (2006.01)

(52) U.S. Cl.
CPC .............. *G07D 7/121* (2013.01); *G02B 6/0001* (2013.01); *G02B 6/0026* (2013.01); *G02B 6/0031* (2013.01); *G02B 6/0068* (2013.01)

(58) Field of Classification Search
CPC combination set(s) only.
See application file for complete search history.

(56) References Cited

U.S. PATENT DOCUMENTS

| 5,001,556 | A | * | 3/1991 | Nakamura | A61B 1/00009 348/70 |
| 9,188,717 | B2 | * | 11/2015 | Nishiwaki | G02B 6/0036 |
| 2006/0056789 | A1 | | 3/2006 | Saito et al. | |
| 2006/0139960 | A1 | | 6/2006 | Sakai et al. | |
| 2007/0051876 | A1 | * | 3/2007 | Sumi | G02B 5/282 250/214 R |

(Continued)

FOREIGN PATENT DOCUMENTS

| JP | 2006085975 A | 3/2006 |
| JP | 2006210309 A | 8/2006 |

(Continued)

OTHER PUBLICATIONS

Japanese Office Action cited in Japanese counterpart application No. JP2013141003, dated Jul. 29, 2014.

*Primary Examiner* — Alex Liew
(74) *Attorney, Agent, or Firm* — Rossi, Kimms & McDowell LLP

(57) ABSTRACT

An illumination apparatus includes: a light source that emits light at a plurality of wavelengths; and a rod-like light guide that shapes light emitted by the light source into a line, wherein the light guide is made of a material including a region in which transmittance of wavelengths is not constant, the light source is arranged at one end of the light guide in a longitudinal direction, the light source includes a wavelength of a region in which transmittance of the light guide is not constant, and a reflection surface including reflection member having reflectance differences for the light at a plurality of wavelengths is formed at the other end of the light guide in the longitudinal direction.

21 Claims, 14 Drawing Sheets

(56) References Cited

U.S. PATENT DOCUMENTS

| | | | |
|---|---|---|---|
| 2008/0088805 A1* | 4/2008 | Wang | G03B 21/208 353/97 |
| 2008/0253146 A1* | 10/2008 | Wang | G02B 6/0001 362/558 |
| 2008/0285137 A1* | 11/2008 | Simmonds | G02B 27/0081 359/630 |
| 2009/0016077 A1 | 1/2009 | Sawada et al. | |
| 2009/0052205 A1* | 2/2009 | Chen | G02B 6/001 362/612 |
| 2010/0045939 A1* | 2/2010 | Huang | G02B 27/0905 353/37 |
| 2012/0002250 A1 | 1/2012 | Qi | |
| 2012/0154876 A1 | 6/2012 | Shimoda | |
| 2013/0258700 A1* | 10/2013 | Schuch | G02B 6/0006 362/555 |

FOREIGN PATENT DOCUMENTS

| | | |
|---|---|---|
| JP | 2007183470 A | 7/2007 |
| JP | 2012146285 A | 8/2012 |

\* cited by examiner

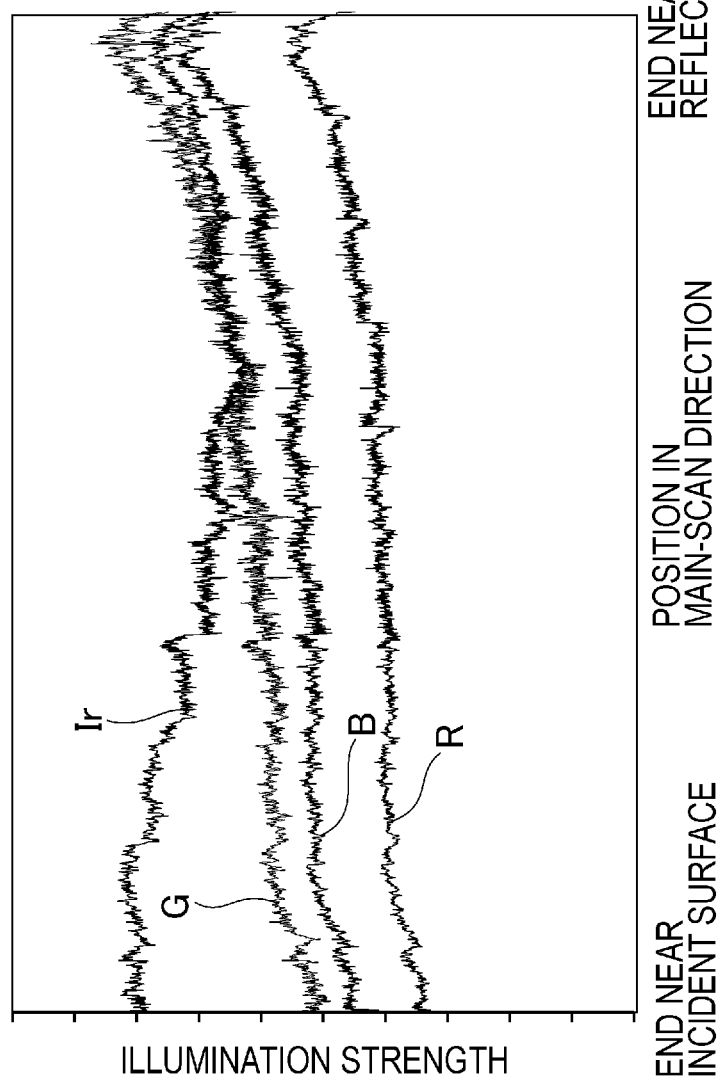

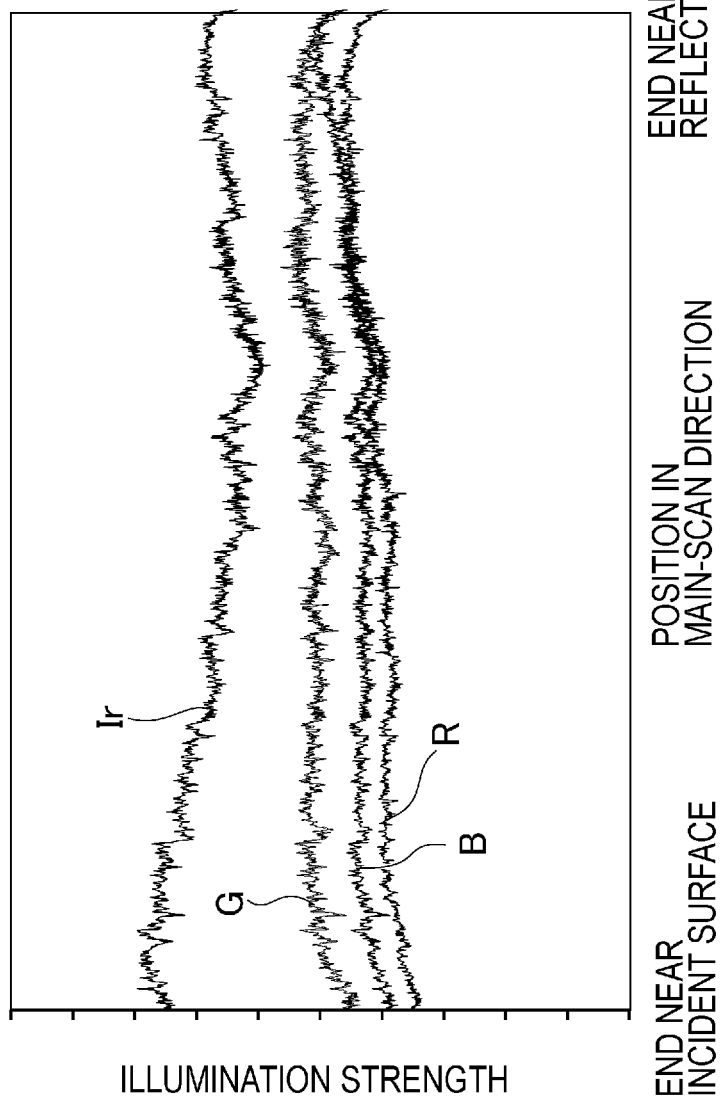

ILLUMINATION APPARATUS, IMAGE SENSOR UNIT, AND PAPER SHEET DISTINGUISHING APPARATUS

CROSS-REFERENCE TO RELATED APPLICATIONS

This application is based upon and claims the benefit of priority of the prior Japanese Patent Application No. 2012-197563, filed on Sep. 7, 2012, and the Japanese Patent Application No. 2013-141003, filed on Jul. 4, 2013, the entire contents of which are incorporated herein by reference.

BACKGROUND OF THE INVENTION

1. Field of the Invention

The present invention relates to an illumination apparatus, an image sensor unit, and a paper sheet distinguishing apparatus. More particularly, the present invention relates to an illumination apparatus that can emit light at a plurality of wavelengths, such as visible light and infrared light, an image sensor unit including the illumination apparatus, and a paper sheet distinguishing apparatus including the image sensor unit.

2. Description of the Related Art

Some image sensor units that read images include rod-like light guides that shape light emitted by point light sources, such as LEDs, into lines. In a configuration with a light source arranged at one end of the light guide in the longitudinal direction, the illumination strength of the light emitted from the light guide may be reduced toward the end on the opposite side. Patent Documents 1 and 2 disclose a light guide including an inclined surface at an angle that does not allow the light to transmit, the inclined surface formed at the end on the side opposite of the light source. According to the configuration, the light reaching the end on the opposite side of the light source is reflected to increase the illumination strength of the light near the end. This can make the luminance distribution of the light uniform throughout the entire light guide.

The image sensor unit that reads an image is also applied to a paper sheet distinguishing apparatus that determines authenticity of bills and the like. To determine the authenticity, the bills include regions in which images obtained under visible light and infrared light are different. Therefore, the image sensor unit applied to the paper sheet distinguishing apparatus can emit visible light and infrared light to the bills to read visible light images and infrared images of the bills.
Patent Document 1: Japanese Laid-open Patent Publication No. 2006-85975
Patent Document 2: Japanese Laid-open Patent Publication No. 2007-183470

The spectral transmittance of the light guide may be different depending on the material used for the light guide. Therefore, if the transmittance of the infrared light is lower than the transmittance of the visible light, the illumination strength of the infrared light emitted from the light guide is reduced toward the end on the opposite side, compared to the illumination strength of the visible light. Therefore, the illumination distribution of the infrared light emitted to the bills tends to be nonuniform. As a result, the reading accuracy of the infrared image may be reduced.

SUMMARY OF THE INVENTION

In view of the circumstances, an object of the present invention is to provide a uniform luminance distribution of light at wavelength with low transmittance in a light guide.

To solve the problem, the present invention provides an illumination apparatus including: a light source including a plurality of light emitting elements that emit light at different wavelengths; and a rod-like light guide that shapes the light emitted by the light source into a line, wherein the light source is arranged at one end of the light guide in a longitudinal direction, the light guide is made of a material having transmittance that is not constant for the light at different wavelengths emitted by the light source, and a reflection surface provided with a reflection material having reflectance differences for the light at different wavelengths is formed on the other end of the light guide in the longitudinal direction.

The present invention provides an image sensor unit including: a light source including a plurality of light emitting elements that emit light at different wavelengths; a rod-like light guide that shapes the light emitted by the light source into a line; a light condenser that condenses light from an illuminated body; and an image sensor that receives reflected light condensed by the light condenser to convert the reflected light to an electric signal, wherein the light source is arranged at one end of the light guide in a longitudinal direction, the light guide is made of a material having transmittance that is not constant for the light at different wavelengths emitted by the light source, and a reflection surface provided with a reflection material having reflectance differences for the light at different wavelengths is formed on the other end of the light guide in the longitudinal direction.

The present invention provides a paper sheet distinguishing apparatus that reads light from an illuminated body while relatively moving an image sensor unit and the illuminated body, wherein the image sensor unit includes: a light source including a plurality of light emitting elements that emit light at different wavelengths; a rod-like light guide that shapes the light emitted by the light source into a line; a light condenser that condenses light from an illuminated body; and an image sensor that receives reflected light condensed by the light condenser to convert the reflected light to an electric signal, wherein the light source is arranged at one end of the light guide in a longitudinal direction, the light guide is made of a material having transmittance that is not constant for the light at different wavelengths emitted by the light source, and a reflection surface provided with a reflection material having reflectance differences for the light at different wavelengths is formed on the other end of the light guide in the longitudinal direction.

BRIEF DESCRIPTION OF DRAWINGS

FIG. 10B is a graph illustrating a luminance distribution of an illumination apparatus including an aluminum film as a reflector of the reflection surface according to a comparative example;

FIG. 10C is a graph illustrating a luminance distribution of the illumination apparatus 1 according to an example of the present invention;

DETAILED DESCRIPTION OF THE PREFERRED EMBODIMENTS

Figure 1:
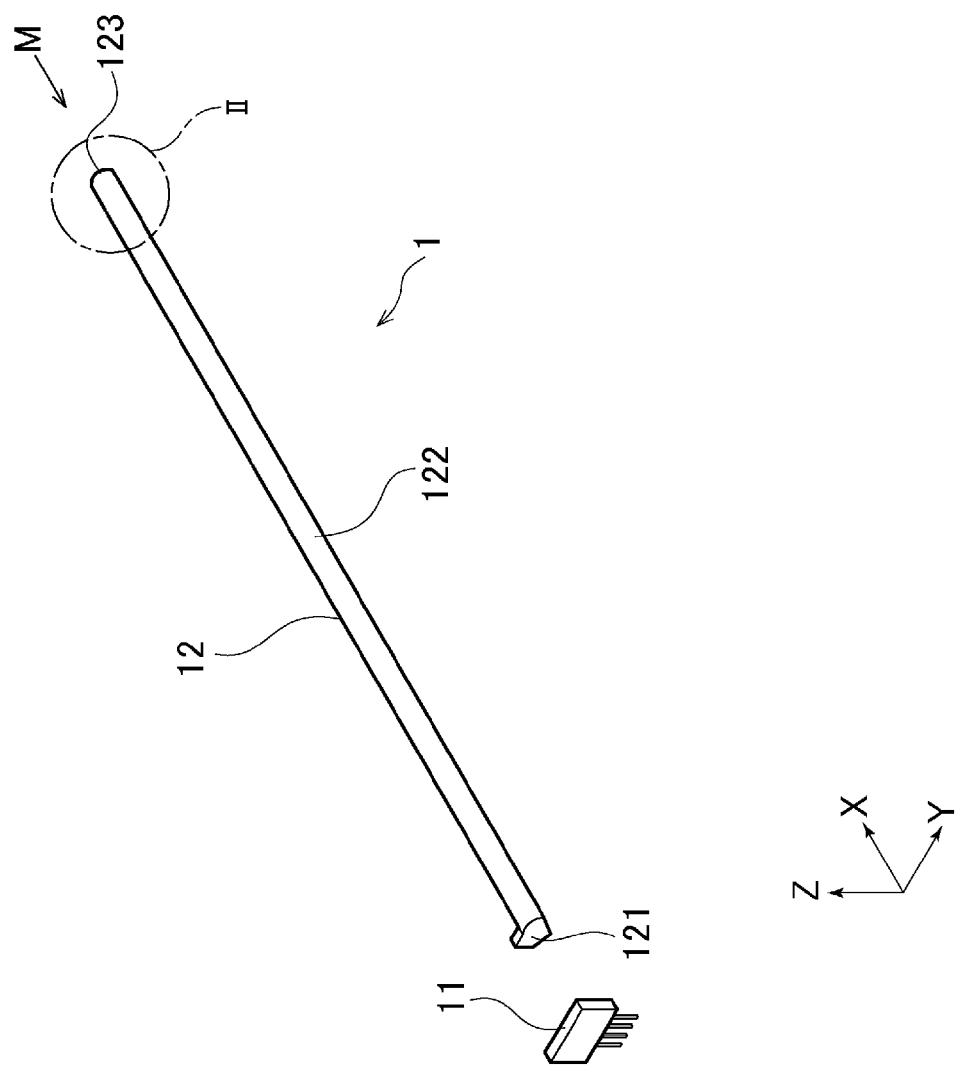
FIG. 1 is a schematic exploded view of a configuration of an illumination apparatus 1.

Embodiments of the present invention will now be described in detail with reference to the drawings. The embodiments of the present invention include an illumination apparatus 1, an image sensor unit 3 including the illumination apparatus 1, and a paper sheet distinguishing apparatus 5 including the image sensor unit 3. In the drawings, three-dimensional directions will be indicated by X, Y, and Z arrows. The X direction is a main-scan direction of the image sensor unit 3. The Y direction is a sub-scan direction of the image sensor unit 3. The Z direction is a vertical direction of the image sensor unit 3.

In the embodiments of the present invention, "light" includes not only visible light, but also electromagnetic waves at wavelengths other than the visible light (for example, wavelengths of infrared region and ultraviolet region).

(Illumination Apparatus)

Figure 2:
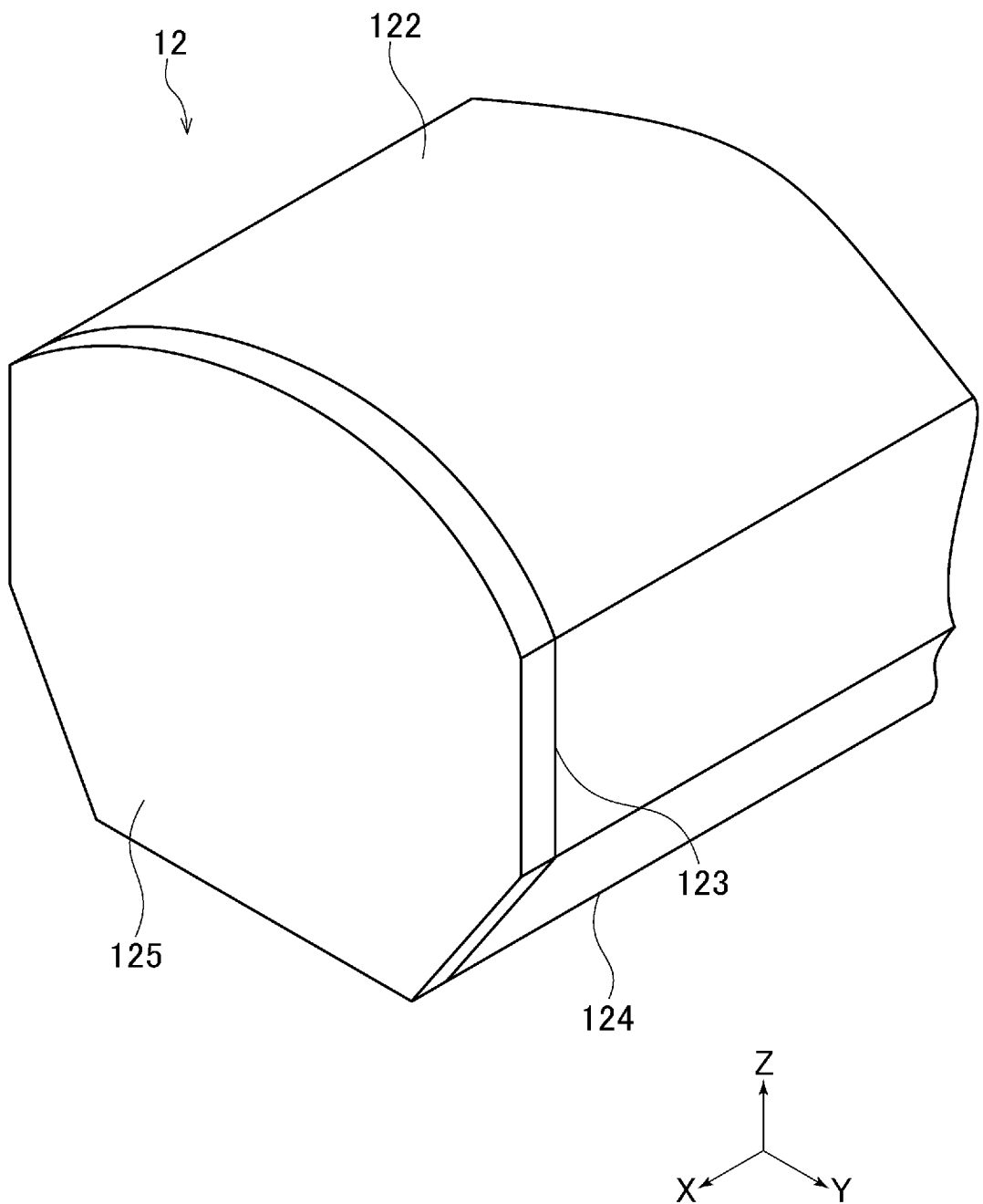
FIG. 2 is an arrow M view of II in FIG. 1.

A configuration of the illumination apparatus 1 will be described with reference to FIGS. 1 and 2. FIG. 1 is a schematic exploded view of the configuration of the illumination apparatus 1. FIG. 2 is an arrow M view of II in FIG. 1. The illumination apparatus 1 emits visible light and infrared light to a bill P as an illuminated body (paper sheet), while being incorporated into the image sensor unit 3 (described later).

As illustrated in FIG. 1, the illumination apparatus 1 includes a light source 11 and a light guide 12.

The light source 11 is arranged at an interval from an incident surface 121 (described later) that is one end face of the light guide 12 in the main-scan direction (longitudinal direction), and the light source 11 emits light to the incident surface 121 of the light guide 12. The light source 11 includes, for example, light emitting elements that emit light at wavelengths of red (R), green (G), blue (B), and infrared (Ir) that are sequentially turned on. The light emitting elements can be various well-known LEDs. The light source 11 is mounted on an upper surface (upper surface in the Z direction) of a circuit board 33 (described later) of the image sensor unit 3.

The light guide 12 is an optical member that shapes the light emitted by the light source 11 into a line. The light guide 12 is made of a transparent resin material, such as an acrylic resin, and is integrally formed by injection molding or the like. The light guide 12 as a whole has a rod-like structure that is long and thin in the main-scan direction.

As illustrated in FIG. 1, one end face of the light guide 12 in the main-scan direction is an incident surface 121 from which the light emitted by the light source 11 enters.

As illustrated in FIG. 2, the other end face of the light guide 12 in the main-scan direction is a reflection surface 123 that reflects the light emitted by the light source 11. In the reflection surface 123, the reflectance of light at a specific wavelength is higher than the reflectance of light at other wavelengths. For example, the reflection surface 123 is provided with a film of a reflector 125 as reflection means in which the reflectance at a specific wavelength is higher than the reflectance at other wavelengths.

As illustrated in FIGS. 1 and 2, an emission surface 122 and a diffusing surface 124 are formed on side surfaces of the light guide 12.

The emission surface 122 is a surface that emits the light entered from the incident surface 121 and the light reflected by the reflection surface 123 to the bill P. The emission surface 122 has a long and thin band shape extending in the main-scan direction. The emission surface 122 emits light to a reading line O (see FIGS. 6 to 9) of the bill P. Therefore, the emission surface 122 has a curved surface that is convex toward the reading line O of the bill P, for example.

The dimension of the emission surface 122 in the main-scan direction is set according to the dimension of the bill P. For example, the image sensor unit 3 performs reading while relatively moving in the longitudinal direction of the bill P, and the dimension of the emission surface 122 in the main-scan direction is set according to the short-side dimension of the bill P.

The diffusing surface 124 is a surface that reflects and diffuses the light entered from the incident surface 121. The diffusing surface 124 is formed to face the emission surface 122. A plurality of prism-like diffusing portions are formed at required intervals on the diffusing surface 124, for example. The intervals of the plurality of diffusing portions become smaller from one end (close to the incident surface 121) to the other end (close to the reflection surface 123) in the main-scan direction.

The diffusing portions may be, for example, a printed pattern made of a light reflective paint created by silk printing or the like. In this case, the density of the printed pattern decreases with a decrease in the distance from the incident surface 121 and increases with an increase in the distance from the incident surface 121. The configuration can prevent or suppress the nonuniformity of the luminance distribution of the light emitted from the emission surface 122. Particularly, the configuration can prevent or suppress the reduction in the illumination strength of the light with an increase in the distance from the incident surface 121 and can prevent or suppress the nonuniformity of the luminance distribution of the light throughout the entire light guide 12.

The other surfaces of the peripheral surfaces of the light guide 12 function as reflection surfaces that reflect light.

Figure 3:
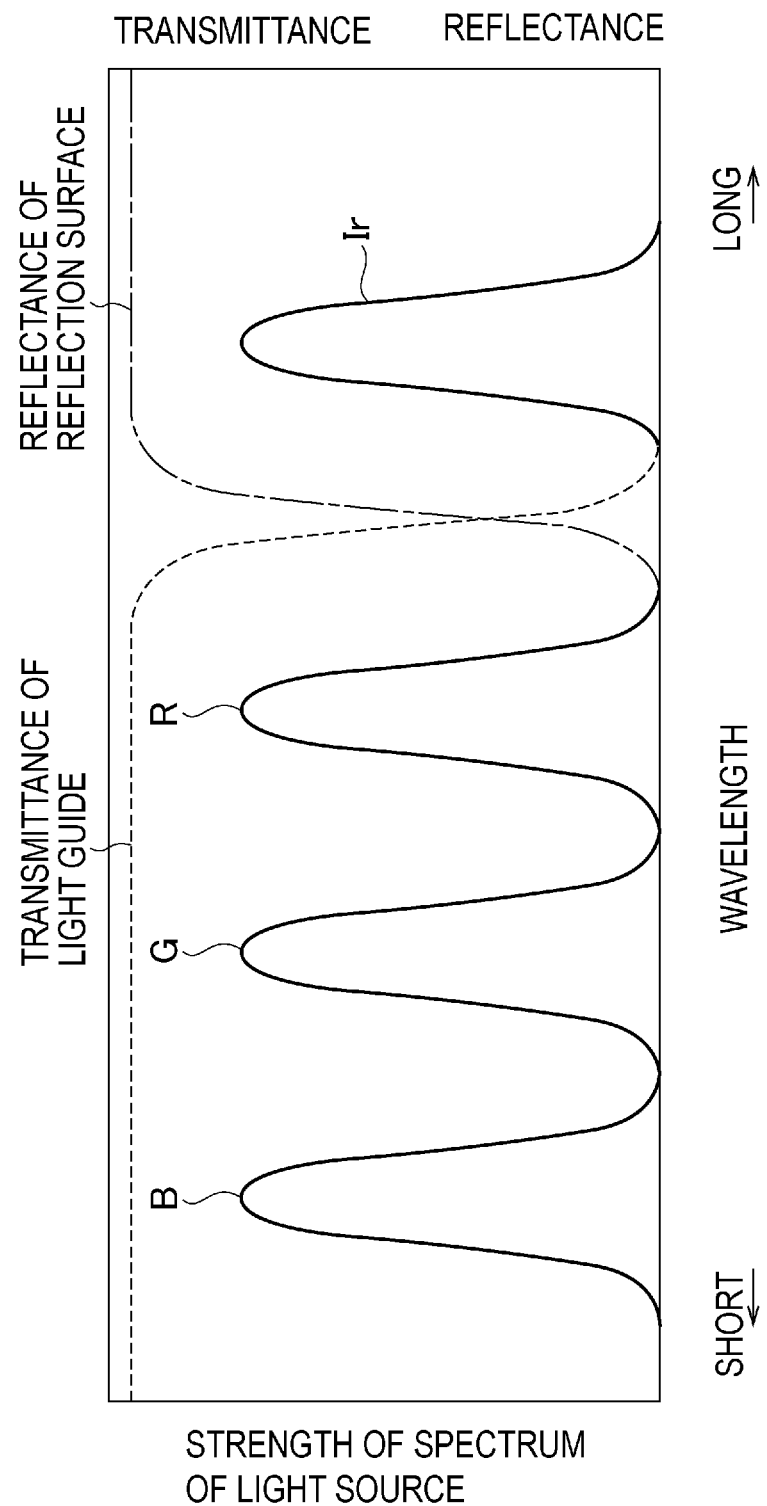
FIG. 3 is a schematic graph of a relationship between strength of a spectrum of a light source 11, transmittance of a light guide 12, and reflectance of a reflection surface 123.

Characteristics of the reflection surface 123 will be described with reference to FIG. 3. The film of the reflector 125 is formed on the reflection surface 123, and the film of the reflector 125 reflects the light. FIG. 3 is a schematic graph of a relationship between strength of a spectrum of the light source 11, transmittance of the light guide 12, and reflectance of the reflector 125 of the reflection surface 123.

Spectral transmittance of a resin material applied to the light guide 12 varies according to the wavelength. More specifically, the light guide 12 is formed of a material including wavelength regions in which the transmittance is not constant. For example, the transmittance of infrared light in an acrylic resin is lower than the transmittance of visible light (light of R, G, and B colors emitted by the light source 11). Therefore, when the light source 11 is arranged at one end of the light guide 12 in the main-scan direction, the illumination strength of the infrared light near the other end of the light guide 12 in the main-scan direction is lower than that of the visible light. As a result, the luminance distribution of the infrared light is nonuniform throughout the entire light guide 12. On the other hand, when the film of the reflector 125 that reflects the light at all wavelengths is formed on the reflection surface 123 arranged at the other end of the light guide 12 in the longitudinal direction, the luminance distribution of the infrared light can be made uniform, but the illumination strength of the visible light near the reflection surface 123 increases. As a result, the luminance distribution is nonuniform throughout the entire light guide 12.

In this way, when the light guide 12 is formed of a material having a lower transmittance of light at a specific wavelength than the transmittance of light at other wavelengths, it is difficult to attain a uniform luminance distribution of light (infrared light here) at a specific wavelength and a uniform luminance distribution of light (visible light here) at other wavelengths.

Therefore, the film of the reflector 125 in which the reflectance of light at a specific wavelength is higher than the reflectance of light at other wavelengths is formed on the reflection surface 123 that is an end face on the opposite side of the incident surface 121 of the light guide 12. More specifically, since the transmittance of the infrared light of the light guide 12 is lower than that of the visible light, the film of the reflector 125 in which the reflectance of the infrared light is higher than the reflectance of the visible light is formed on the reflection surface 123 of the light guide 12.

According to the configuration, the infrared light entered from the incident surface 121 and reached the reflection surface 123 is reflected by the reflection surface 123 and emitted from the emission surface 122. This can prevent the reduction in the illumination strength of the infrared light with an increase in the distance from the incident surface 121 and can make the luminance distribution of the infrared light uniform.

On the other hand, the visible light entered from the incident surface 121 and reached the reflection surface 123 is reflected or absorbed by the reflection surface 123 according to the reflectance of the reflector 125. This can prevent the increase in the illumination strength of the visible light near the end of the reflection surface and can make the luminance distribution of the visible light uniform.

This can attain a uniform luminance distribution of the infrared light and a uniform luminance distribution of the visible light throughout the entire light guide 12.

In this way, the film of the reflector 125 made of a reflection material with wavelength selectivity, including differences in the reflectance (or absorptance), is formed as an example of reflection means on the reflection surface 123. For example, a configuration of applying paint with such a characteristic as the reflection material (configuration of forming a film) can be adopted. Various well-known paints, such as infrared reflective pigments, can be used as the paint.

Figure 4:
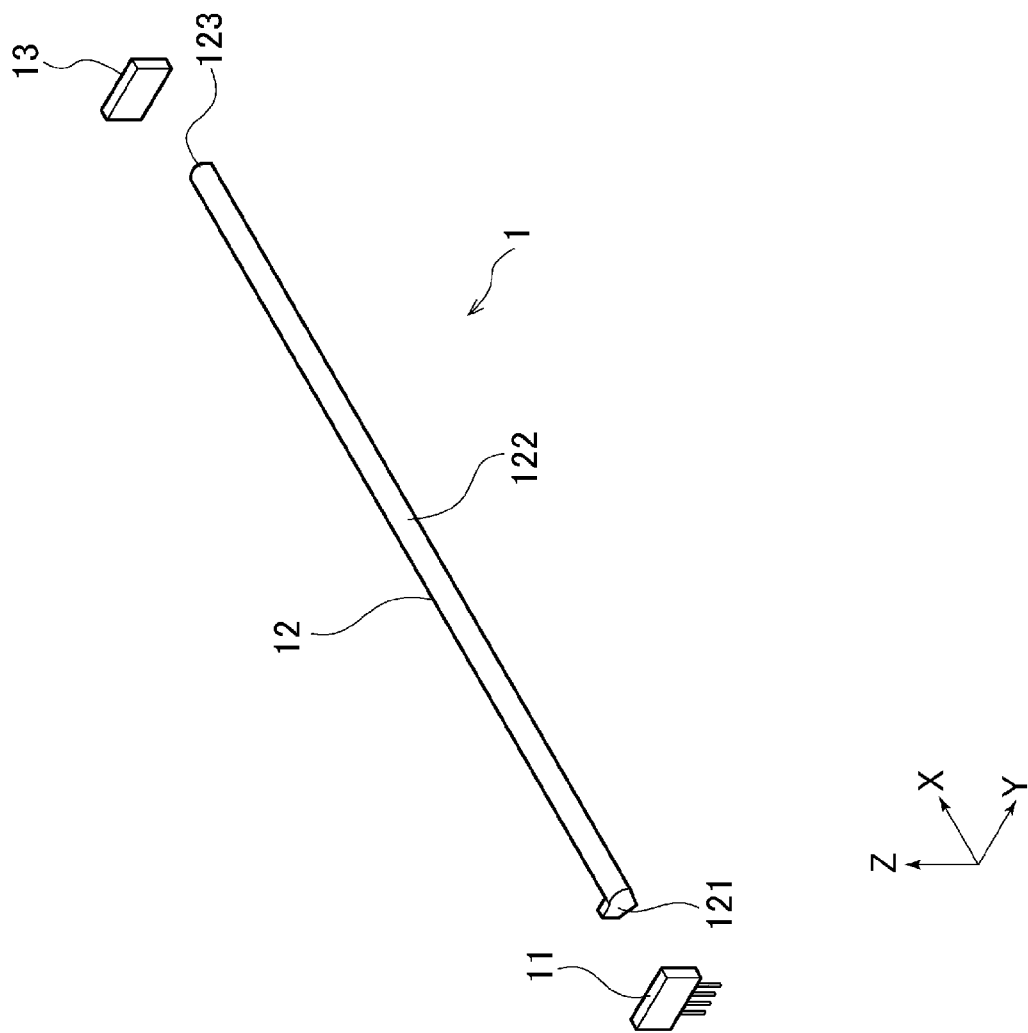
FIG. 4 is a schematic exploded view of a configuration of the illumination apparatus 1 including a reflection member 13 independent from the light guide 12.

Alternatively, a reflection member 13 containing the reflection material formed independently from the light guide 12 may be included as an example of reflection means. FIG. 4 is a schematic exploded view of a configuration of the illumination apparatus 1 including the reflection member 13 independent from the light guide 12. As illustrated in FIG. 4, the light source 11 is arranged at one end of the light guide 12 in the main-scan direction, and the reflection member 13 is arranged at the other end. The reflection member 13 has the same surface properties as the reflector 125. For example, the plate or the like with the paint as the reflection material applied thereto as described above is used for the reflection member 13. The reflection member 13 is arranged to face the reflection surface 123 of the light guide 12 or to touch the reflection surface 123. According to the configuration, the infrared light emitted from the reflection surface 123 of the light guide 12 to the outside of the light guide 12 is reflected by the reflection member 13 and enters the light guide 12 again. Therefore, the same advantageous effects can be attained.

(Image Sensor Unit)

Figure 5:
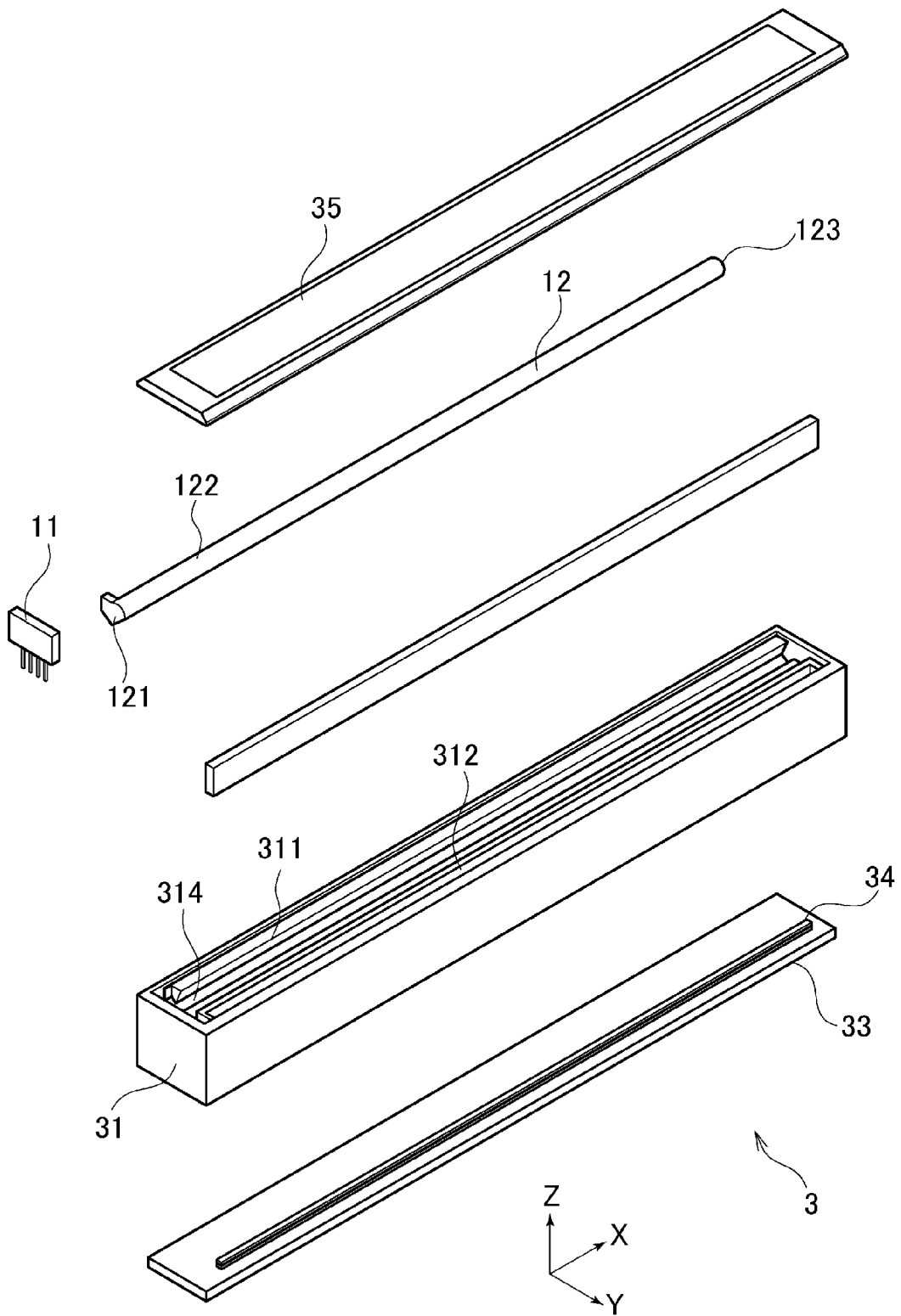
FIG. 5 is a schematic exploded view of a configuration of an image sensor unit 3.
Figure 6:
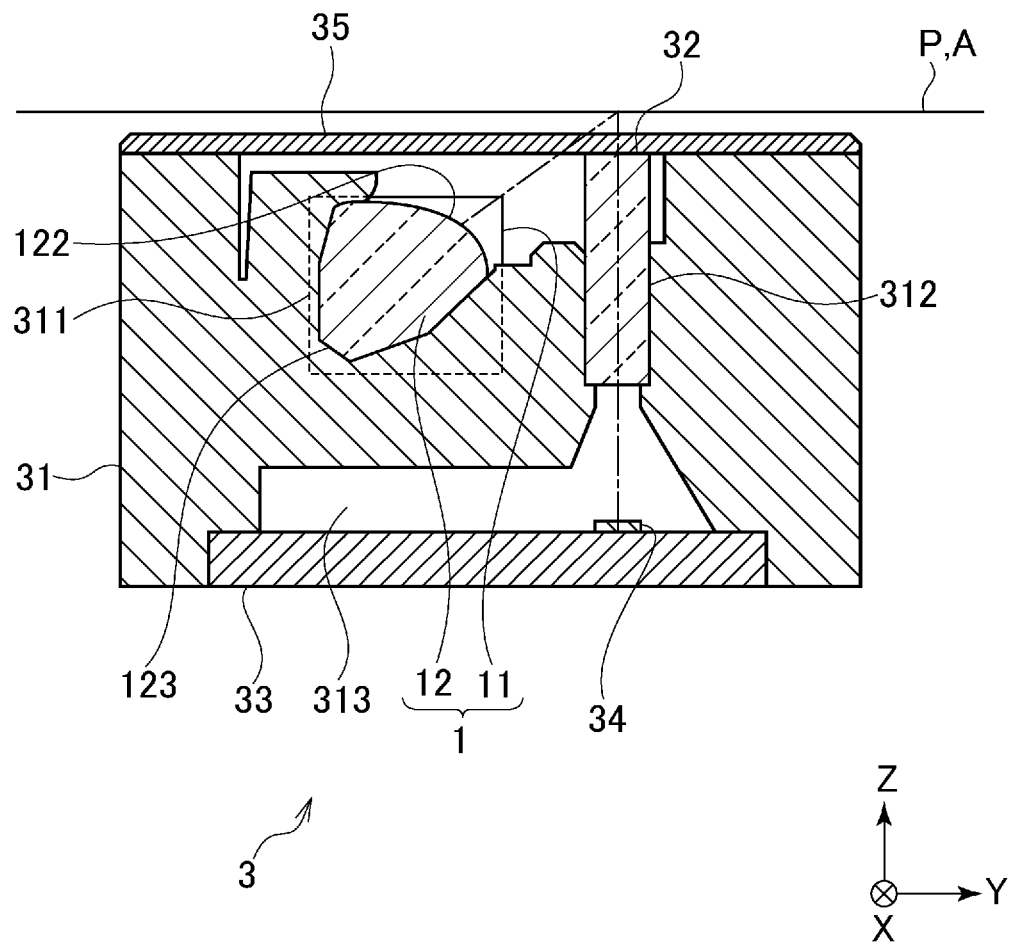
FIG. 6 is a schematic sectional view of an internal structure of the image sensor unit 3, illustrating a cross section taken along a plane perpendicular to a main-scan direction.

A configuration of the image sensor unit 3 will be described with reference to FIGS. 5 and 6. FIG. 5 is a schematic exploded view of the configuration of the image sensor unit 3. FIG. 6 is a schematic sectional view of an internal structure of the image sensor unit 3, illustrating a cross section taken along a plane perpendicular to the main-scan direction. The image sensor unit 3 can read an image of the bill P based on visible light and infrared light from the bill P.

The image sensor unit 3 includes an illumination apparatus 1, a frame 31, a light condenser 32, a circuit board 33, and a cover member 35. An image sensor 34 is arranged on an upper surface of the circuit board 33.

The frame 31 is a housing of the image sensor unit 3. The frame 31 has a rod-like structure and is formed of a light-blocking resin material colored in black, for example. Polycarbonate can be used for the resin material, for example. On the upper part of the frame 31 in the Z direction, a light guide housing chamber 311 that can house the light guide 12 of the illumination apparatus 1 and a light condenser housing chamber 312 that can house the light condenser 32 are formed. On the lower part of the frame 31 in the Z direction, a substrate housing chamber 313 that can house the circuit board 33 is formed. The light condenser housing chamber 312 and the substrate housing chamber 313 are connected by an opening through which the light can pass. At an end of the frame 31 in the main-scan direction, a light source housing chamber 314 that can house the light source 11 of the illumination apparatus 1 is further formed. When the illumination apparatus 1 includes the reflection member 13, a reflection member housing chamber that can house the reflection member 13 of the illumination apparatus 1 is formed at the other end of the frame 31 in the main-scan direction.

The light condenser 32 is an optical member that forms an image of the visible light and the infrared light from the bill P on the surface of the image sensor 34 (described later). The light condenser 32 can be a rod-lens array. A general rod-lens array includes a plurality of image forming elements (rod lenses) of an erect equal magnification imaging type arranged in a line in the main-scan direction. The specific configuration of the light condenser 32 is not limited as long as the image forming elements are arranged in a line. For example, the light condenser 32 may include image forming elements arranged in a plurality of lines. Various well-known optical members with a condensing function, such as various well-known micro-lens arrays, can be used as the light condenser 32.

The circuit board 33 has a rectangular structure that is long in the main-scan direction. The image sensor 34 and the light source 11 of the illumination apparatus 1 are mounted on an upper surface of the circuit board 33 (upper surface in the Z direction). The light source 11 is mounted near one end of the circuit board 33 in the main-scan direction so as to emit light to the incident surface 121 of the light guide 12. Meanwhile, the image sensor 34 is mounted so that the light receiving surface faces upward in the Z direction to receive light from the light condenser 32. Connectors and the like for wire connection to the outside are further mounted on the circuit board 33.

The image sensor 34 converts the light focused by the light condenser 32 to an electric signal. The image sensor 34 can be an image sensor IC array. The image sensor IC array includes a plurality of image sensor ICs mounted in a line in the main-scan direction on the surface of the circuit board 33. The image sensor ICs include a plurality of light receiving elements (may also be called photoelectric conversion elements) corresponding to the resolution of reading by the image sensor unit 3. In this way, the image sensor 34 includes a plurality of image sensor ICs (light receiving elements) arranged in a line in the main-scan direction. The configuration of the image sensor 34 is not particularly limited as long as a plurality of image sensor ICs are arranged in a line. For example, the image sensor ICs may be arranged in a plurality of lines to form a staggered arrangement. The image sensor ICs included in the image sensor IC array as the image sensor 34 can be various conventional well-known image sensor ICs sensitive to the visible light and the infrared light.

The cover member 35 is arranged to cover the upper side of the frame 31. The cover member 35 has a function of protecting the light guide 12 and the light condenser 32 and has a function of maintaining the plane surface of the bill P by coming into contact with the bill P. The cover member 35 is a planar member, and the cover member 35 can be a glass plate or a transparent resin plate with equivalent strength.

The image sensor unit 3 further includes an attachment portion for attachment to the paper sheet distinguishing apparatus 5 (described later) and a connector for electrical connection to the paper sheet distinguishing apparatus 5. The configurations of the attachment portion and the connector are not particularly limited. The attachment portion can have any configuration that can attach the image sensor unit 3 to the paper sheet distinguishing apparatus 5. The connector can have any configuration that can connect the image sensor unit 3 and a predetermined device of the paper sheet distinguishing apparatus 5 to allow transmission and reception of power or electric signals.

As illustrated in FIGS. 5 and 6, the light guide 12 is housed in the light guide housing chamber 311 of the frame 31. The light condenser 32 is housed in the light condenser housing chamber 312 of the frame 31. The circuit board 33 mounted with the light source 11 and the image sensor 34 is housed in the substrate housing chamber 313.

When the light guide 12 is housed in the light guide housing chamber 311 and the circuit board 33 mounted with the light source 11 is housed in the substrate housing chamber 313, the light source 11 is housed in the light source housing chamber 314 to face the incident surface 121 formed at one end of the light guide 12. Therefore, the light emitted by the light source 11 enters the incident surface 121 formed at one end of the light guide 12. When the reflection member 13 independent from the light guide 12 is used, the reflection member 13 faces (or touches) the other end of the light guide 12. As a result, the light emitted from the other end of the light guide 12 is reflected by the reflection member 13 and enters the light guide 12 again.

Other than the configuration of arranging the film of the reflector 125 or the reflection member 13 on the reflection surface 123 of the light guide 12, a configuration of forming the film of the reflector 125 on an inner surface of the light guide housing chamber 311 of the frame 31, the surface opposing (or touching) the reflection surface 123 of the light guide 12, is also possible. The configuration can also attain the advantageous effects.

To emit light to the bill P, the light source 11 sequentially turns on the light emitting elements of each color and infrared light. The light (visible light of RGB colors and infrared light) emitted by the light source 11 enters the light guide 12 from the incident surface 121 of the light guide 12 and propagates inside while being reflected by the diffusing surface 124 and other reflection surfaces. The light is emitted from the emission surface 122 of the light guide 12 to the reading line O of the bill P.

The light condenser 32 focuses the reflected light from the reading line O of the bill P on the surface of the image sensor 34. The image sensor 34 converts an optical image formed by the light condenser 32 to an electric signal.

The image sensor unit 3 repeats, in a short time, the operation of emitting visible light of each color and infrared light to the bill P and detecting reflected light. Based on the operation, the image sensor unit 3 reads a visible light image of a predetermined pattern (for example, a hologram) arranged in the bill P and reads an infrared image of the bill P.

The parts of the image sensor unit 3 not illustrated and not described can be the same as in conventional well-known image sensor units.

(Paper Sheet Distinguishing Apparatus)

Figure 7:
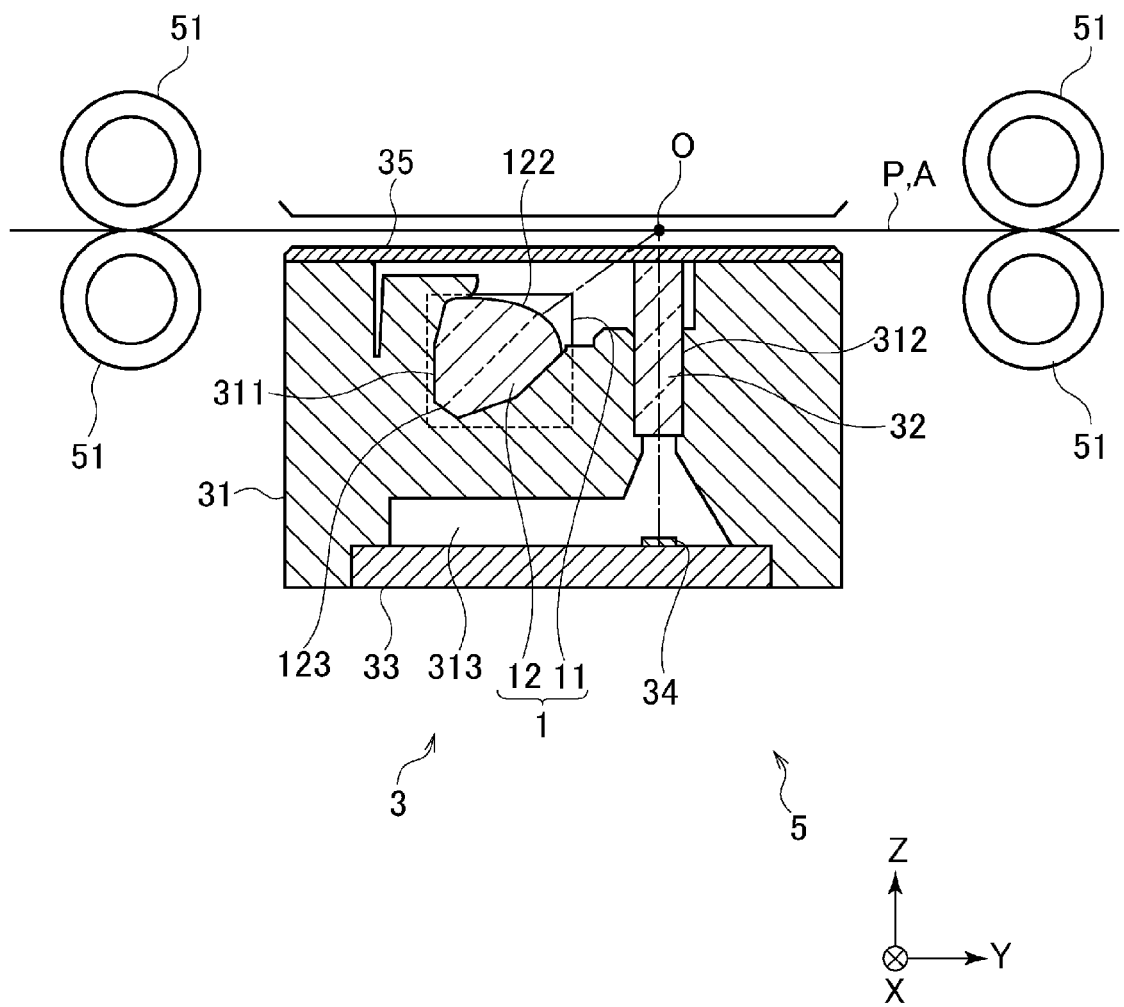
FIG. 7 is a schematic sectional view of a configuration of a paper sheet distinguishing apparatus 5, illustrating a cross section taken along a plane perpendicular to the main-scan direction.

The paper sheet distinguishing apparatus 5 to which the image sensor unit 3 is applied will be described with reference to FIG. 7. FIG. 7 is a schematic sectional view of a configuration of the paper sheet distinguishing apparatus 5, illustrating a cross section taken along a plane perpendicular to the main-scan direction. The paper sheet distinguishing apparatus 5 emits light to the bill P or the like to read light from the bill P and uses the read light to distinguish the type or authenticity of the bill P.

As illustrated in FIG. 7, the paper sheet distinguishing apparatus 5 includes the image sensor unit 3 and conveyor rollers 51 that convey the bill P. In the paper sheet distinguishing apparatus 5, a conveyance path A for holding the bill P to convey the bill P in the reading direction (sub-scan direction) over the image sensor unit 3 through the cover member 35 is set between the conveyor rollers 51. In this case, focusing of the bill P by the light condenser 32 is set at the center of the conveying path A. The operation of the paper sheet distinguishing apparatus 5 with the configuration is as follows. Based on the operation described above, the image sensor unit 3 applied to the paper sheet distinguishing apparatus 5 reads a visible light image of a predetermined pattern arranged on the bill P and reads an infrared image of the bill P. The paper sheet distinguishing apparatus 5 then determines the authenticity of the bill P by comparing a genuine bill image, which is obtained by emitting visible light and infrared light to a prepared genuine bill P, with the visible light image and the infrared image of the bill P to be determined in the authenticity determination. This is because the genuine bill P includes a region in which the images obtained under visible light and under infrared light are different. The parts not described and not illustrated can be the same as in a conventional paper sheet distinguishing apparatus.

Figure 8:
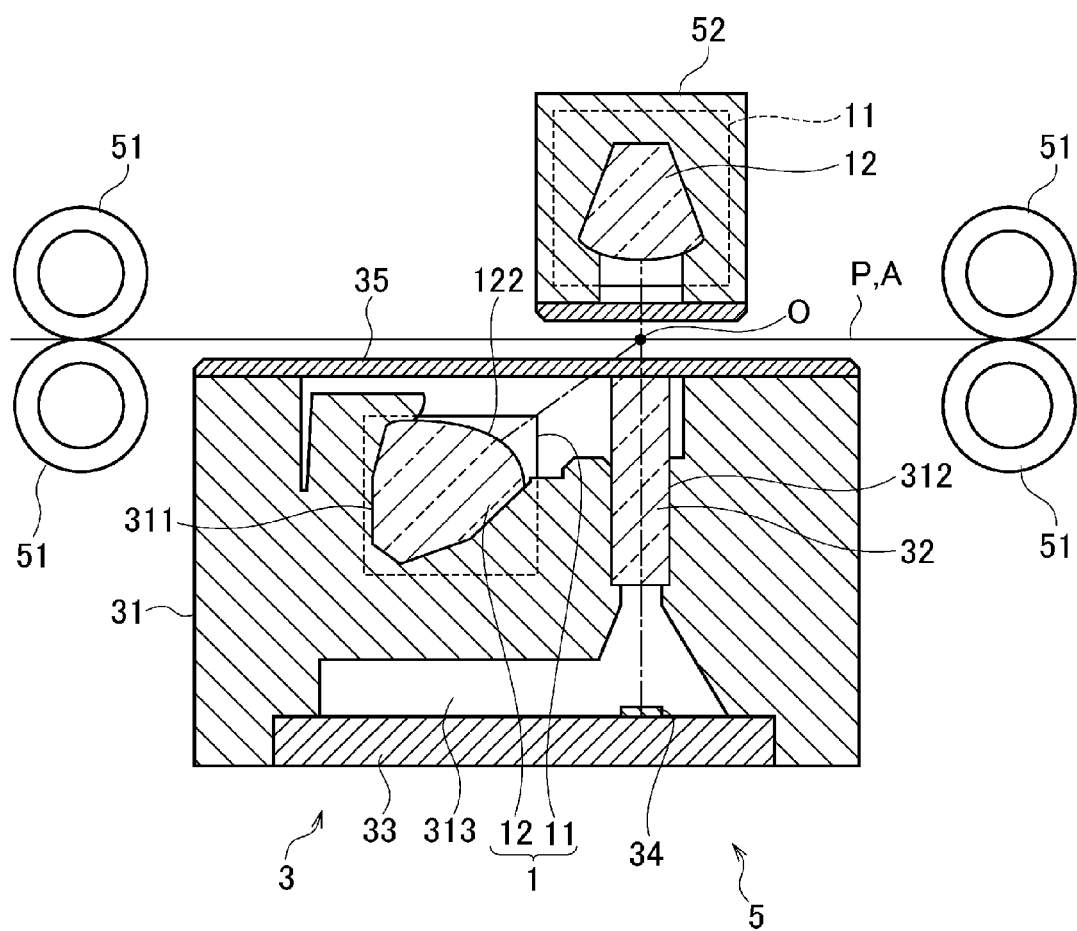
FIG. 8 is a schematic sectional view of a configuration of the paper sheet distinguishing apparatus 5 further including a transmission illumination apparatus 52.

The paper sheet distinguishing apparatus 5 may further include a transmission illumination apparatus 52. FIG. 8 is a schematic sectional view of a configuration of the paper sheet distinguishing apparatus 5 further including the transmission illumination apparatus 52.

The transmission illumination apparatus 52 includes the light source 11 and the light guide 12. The light source 11 and the light guide 12 of the transmission illumination apparatus 52 have the same configurations as those of the light source 11 and the light guide 12 described above. The transmission illumination apparatus 52 is arranged at a position facing the image sensor unit 3 to emit visible light and infrared light to the bill P. Particularly, the transmission illumination apparatus 52 is arranged so that an optical axis of the light emitted from the emission surface 122 of the light guide 12 and an optical axis of the light condenser 32 of the image sensor unit 3 coincide.

The operation of the paper sheet distinguishing apparatus 5 with the configuration is as follows. The light source 11 of the illumination apparatus 1 incorporated into the image sensor unit 3 and the light source 11 of the transmission illumination apparatus 52 sequentially turn on the light emitting elements of the visible light of each color and the infrared light.

The visible light and the infrared light emitted from the illumination apparatus 1 of the image sensor unit 3 to the bill P are reflected by the surface of the bill P and enter the light condenser 32, and an image is formed on the surface of the image sensor 34. The image sensor 34 converts the formed optical image to an electric signal to acquire an image of the visible light and an image of the infrared light based on the reflected light from the bill P. Meanwhile, the visible light and the infrared light emitted from the transmission illumination apparatus 52 to the bill P transmit through the bill P to enter the light condenser 32 of the image sensor unit 3, and an image is formed on the surface of the image sensor 34. The image sensor 34 converts the formed optical image to an electric signal to acquire a visible light image and an infrared image based on the transmitted light from the bill P.

The image sensor unit 3 and the transmission illumination apparatus 52 repeat, in a short time, the operation of emitting the visible light of each color and the infrared light to the bill P and detecting the reflected light and the transmitted light. Based on the operation, the image sensor unit 3 reads a visible light image of a predetermined pattern (for example, a hologram) arranged on the bill P and reads an infrared image of the bill P.

According to the configuration, the paper sheet distinguishing apparatus 5 can read the visible light image and the infrared image based on the reflected light and the transmitted light of the bill P.

Figure 9:
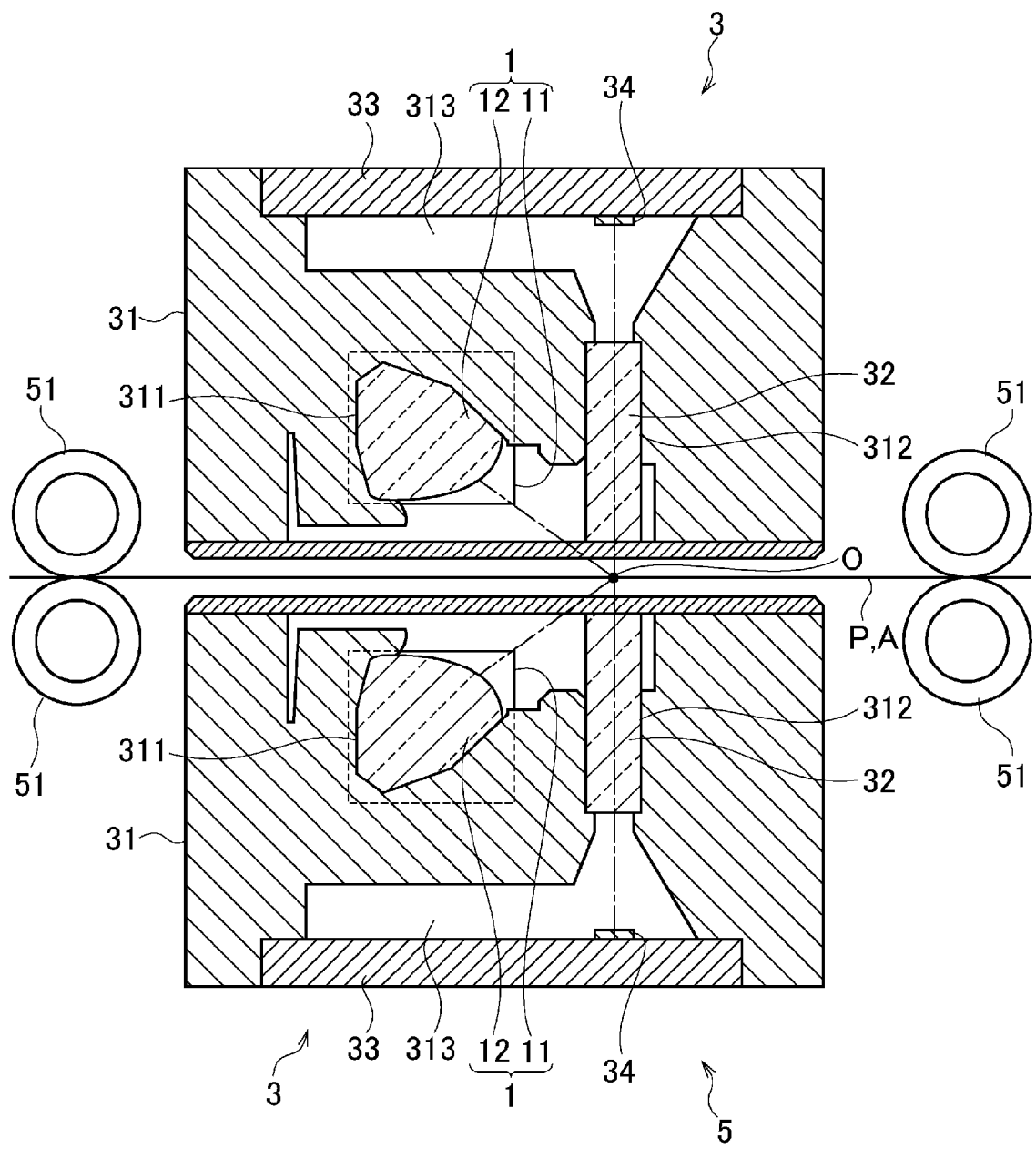
FIG. 9 is a schematic sectional view of a configuration of the paper sheet distinguishing apparatus 5 including two sets of image sensor units 3.

The paper sheet distinguishing apparatus 5 may also include two sets of image sensor units 3. FIG. 9 is a schematic sectional view of a configuration of the paper sheet distinguishing apparatus 5 including two sets of image sensor units 3.

As illustrated in FIG. 9, the two sets of image sensor units 3 are arranged to face each other across the conveyance path A of the bill P. The two sets of image sensor units 3 are arranged so that the visible light and the infrared light emitted from the illumination apparatus 1 of one of the image sensor units 3 and transmitted through the bill P enter the light condenser 32 of the other image sensor unit 3.

The operation of the paper sheet distinguishing apparatus 5 with the configuration is as follows. The light sources 11 of the illumination apparatuses 1 incorporated into the two sets of image sensor units 3 sequentially turn on the light emitting elements of the visible light of each color and the infrared light. The visible light and the infrared light emitted from the illumination apparatus 1 of one of the image sensor units 3 to the bill P are reflected by the surface of the bill P and enter the light condenser 32 of one of the image sensor units 3, and an image is formed on the surface of the image sensor 34 of one of the image sensor units 3. The image sensor 34 of one of the image sensor units 3 converts the formed optical image to an electric signal to acquire a visible light image and an infrared image based on the reflected light from the bill P. The visible light and the infrared light emitted from the illumination apparatus 1 of one of the image sensor units 3 to the bill P transmit through the bill P and enter the light condenser 32 of the other image sensor unit 3, and an image is formed on the surface of the image sensor 34 of the other image sensor unit 3. The image sensor 34 of the other image sensor unit 3 converts the formed optical image to an electric signal to acquire a visible light image and an infrared image based on the transmitted light from the bill P.

According to the configuration, the paper sheet distinguishing apparatus 5 can read reflected images of both surfaces of the bill P and can read transmitted images.

EXAMPLES

Figure 10A:
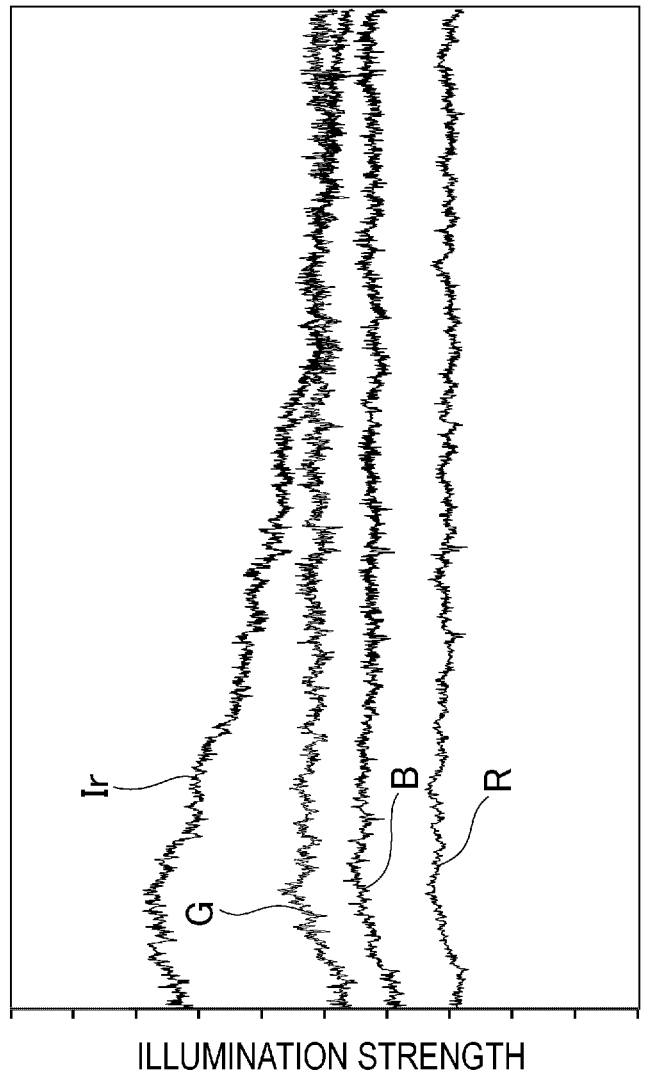
FIG. 10A is a graph illustrating a luminance distribution of an illumination apparatus not including a reflection surface with wavelength selectivity on an opposite side of an incident surface of a light guide according to a comparative example.

Examples of verification of the advantageous effects of the present invention will be described with reference to FIGS. 10A to 10C. FIG. 10A is a graph illustrating a luminance distribution of an illumination apparatus not including the reflection surface with wavelength selectivity on the opposite side of the incident surface of the light guide according to a first comparative example. FIG. 10B is a graph illustrating a luminance distribution of an illumination apparatus including an aluminum film as a reflector of the reflection surface according to a second comparative example. FIG. 10C is a graph illustrating a luminance distribution of the illumination apparatus 1 according to an example of the present invention using "IR Black Color" (made by Seiko advance Ltd.), which is an infrared reflective pigment, as a reflection material for the reflection surface.

Figure 11:
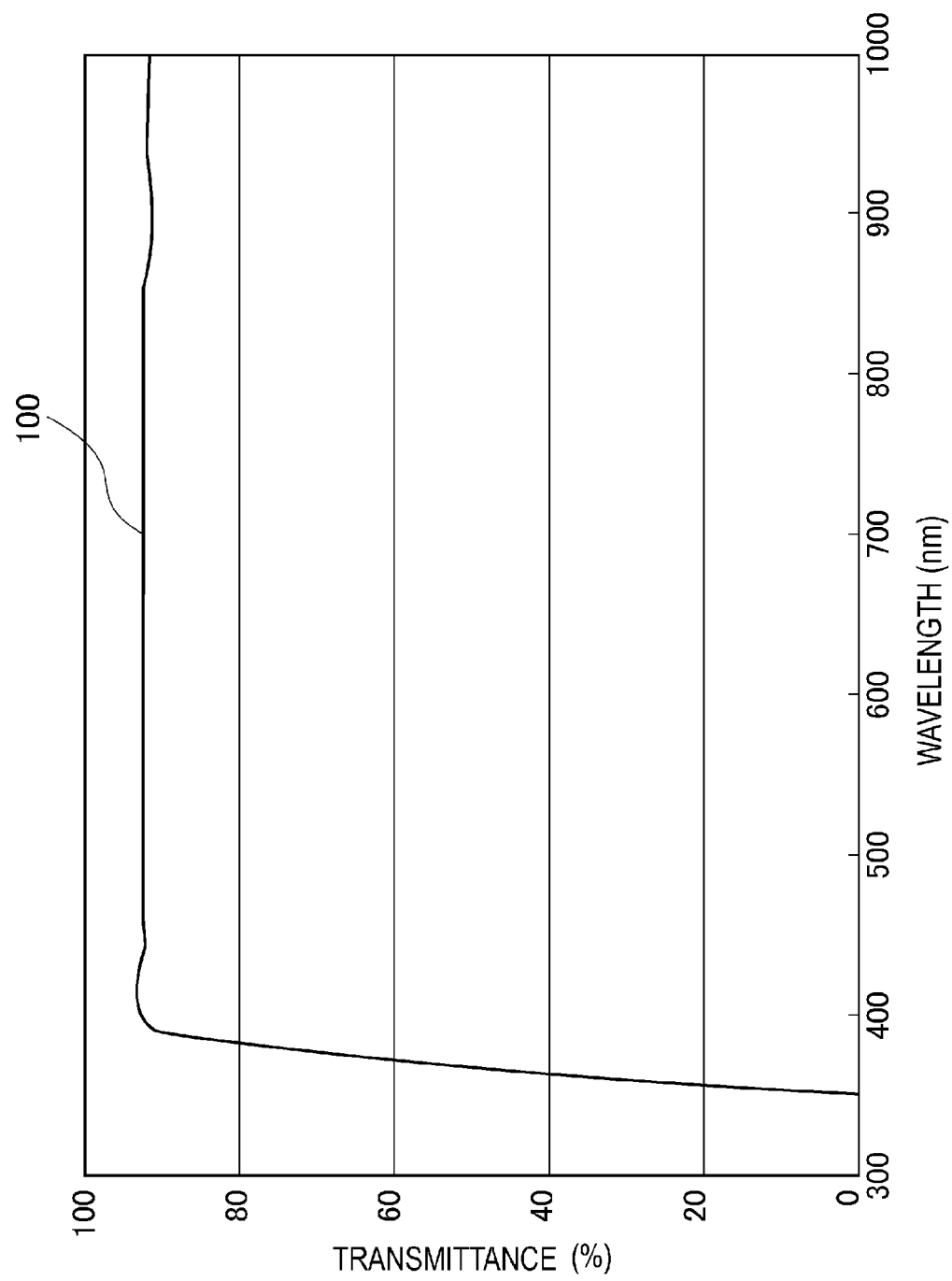
FIG. 11 is a view illustrating spectral transmittance of an acrylic resin.
Figure 12:
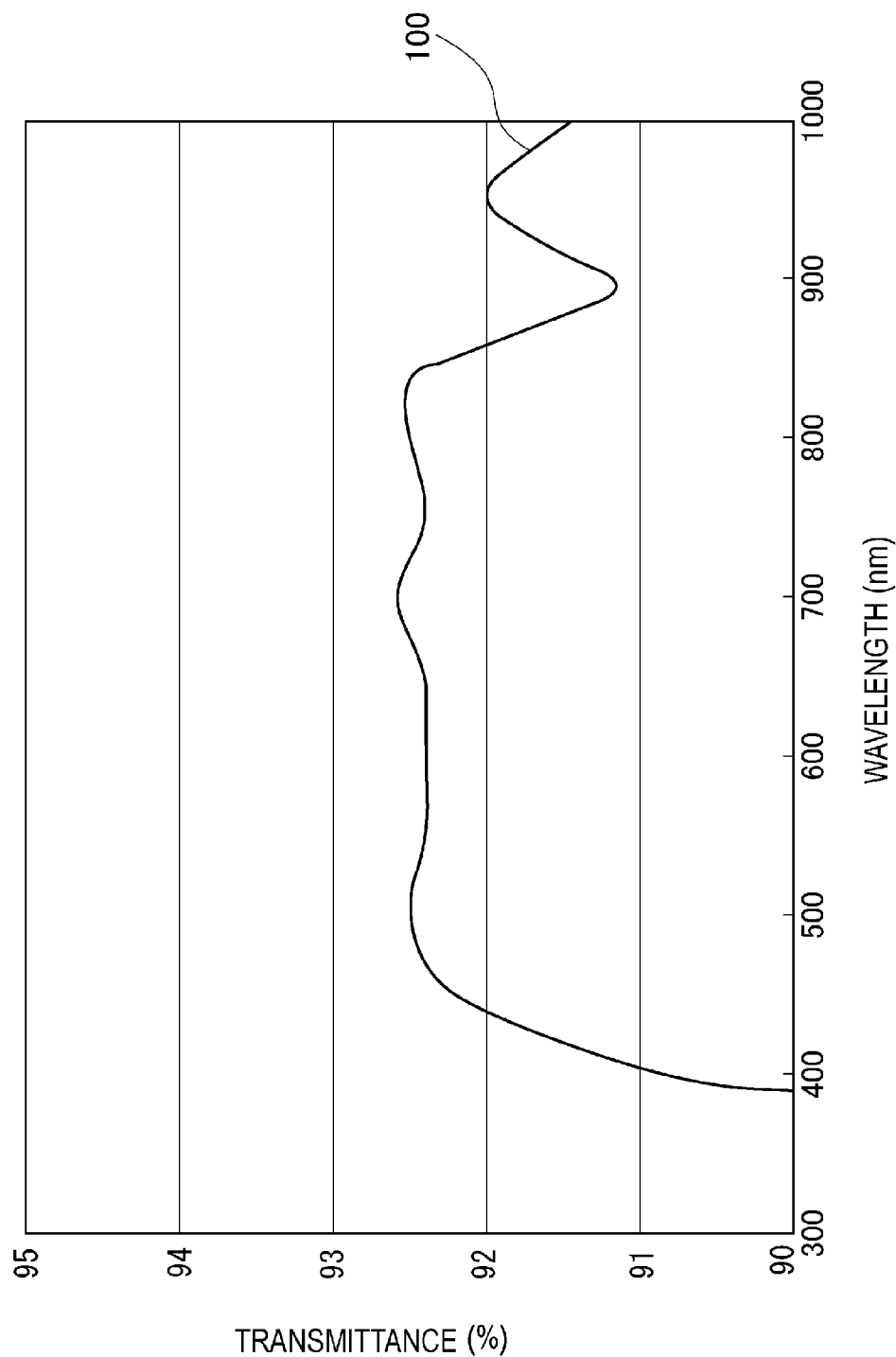
FIG. 12 is a partially enlarged view illustrating the spectral transmittance of the acrylic resin.

FIG. 11 is a view illustrating spectral transmittance of an acrylic resin. FIG. 12 is a partially enlarged view of FIG. 11. As illustrated in FIGS. 11 and 12, a line 100 denotes spectral transmittance of the acrylic resin. The spectral transmittance indicates transmittance at each wavelength of light. The absorption of light decreases in the acrylic resin with an increase in the transmittance, and the absorption of light increases in the acrylic resin with a decrease in the transmittance.

For example, synthetic resins include regions for absorbing the infrared light. The acrylic resin includes the region at 800 to 1000 nm. This is specific to the material, and vibrations caused by the structure of the synthetic resin absorb the infrared light.

The spectral transmittance of the acrylic resin in FIGS. 11 and 12 indicates data of a test piece with a thickness (d)=2 mm. Therefore, the effect is accumulated throughout 220 to 230 mm in a light guide with a width of A4, for example.

In the example of the present invention, aluminum is used for the reflector 125 of the reflection surface 123.

The first comparative example of FIG. 10A illustrates a configuration without the formation of the reflection surface with wavelength selectivity on the opposite side of the incident surface of the light guide. Although the luminance distribution of the visible light is substantially uniform, the luminance distribution of the infrared light decreases with an increase in the distance from the incident surface. This may be because when the acrylic resin is used for the light guide, the amount of infrared light emitted from the emission surface is reduced with an increase in the distance from the incident surface, since the transmittance of the infrared light (Ir) in the range of 800 to 1000 nm is lower than the transmittance of the visible light (R, G, and B). In this way, the luminance distribution of the infrared light is nonuniform in the configuration without the formation of the reflection surface with wavelength selectivity on the opposite side of the incident surface of the light guide.

The second comparative example of FIG. 10B illustrates a configuration including an aluminum film arranged on the reflection surface. The reduction in the illumination strength of the infrared light with an increase in the distance from the incident surface is prevented. However, the illumination strength of the visible light increases with a decrease in the distance from the reflection surface. This may be because the visible light is reflected by the reflection surface and emitted from the emission surface, since there isn't much difference in the reflectance of aluminum between the visible light and the infrared light. In this way, the luminance distribution of the visible light is nonuniform in the configuration in which the reflection surface reflects the light at all wavelengths emitted by the light source.

FIG. 10C illustrates the example of the present invention including the reflection surface with wavelength selectivity. The luminance distribution of the infrared light is more uniform than in the example illustrated in FIG. 10A, and the luminance distribution of the visible light is maintained in a uniform state compared to the example illustrated in FIG. 10B. In this way, according to the example of the present invention, the luminance distributions of the visible light and the infrared light can be made uniform.

Although the embodiments of the present invention have been described with reference to the drawings, the present invention is not limited to the embodiments in any sense. Various modifications can be made without departing from the scope of the present invention. For example, although the reflectance of the infrared light of the reflection surface of the light guide is higher than that of the visible light in the embodiments, the characteristic of the reflection surface is not limited to this characteristic. A reflection surface for selectively reflecting the light absorbed by the material used for the light guide 12 can be formed at the other end to form uniform illumination between short wavelength and long wavelength by a material with low transmittance at short wavelength such as ultraviolet light. In this case, the light source 11 can include light emitting elements (for example, ultraviolet light LEDs) that emit light at shorter wavelength than the visible light, such as an ultraviolet region.

In this way, when the light source emits light at a plurality of wavelengths and the transmittance of the light guide is lower at a specific part of wavelength in the light at a plurality of wavelengths emitted by the light source than at other wavelengths, the reflection surface with differences in the reflection at the specific part of wavelength can be formed on the other end face of the light guide.

Although the bill is applied as the paper sheet in the embodiments, the type of the paper sheet is not limited. For example, the paper sheet can be various securities and ID cards. A paper sheet that reacts to the infrared light can be applied regardless of the type.

The present invention is an effective technique for use in an illumination apparatus, an image sensor unit, and a paper sheet distinguishing apparatus.

According to the present invention, the reflection means having reflectance differences at the end of the light guide on the opposite side of the light source reflects the light at a plurality of wavelengths from the light source. This can prevent or suppress the reduction in the illumination strength and the nonuniformity of the luminance distribution.

What is claimed is:

1. An illumination apparatus comprising:
   a light source comprising a plurality of light emitting elements that emit light at different wavelengths; and
   a rod-like light guide that shapes the light emitted by the light source into a line, wherein
   the light source is arranged at one end of the light guide in a longitudinal direction, adjacent an incident surface, and
   a reflection surface provided with a reflection material having reflectance differences for the light at different wavelengths is formed on the other end of the light guide in the longitudinal direction, the reflection surface being arranged parallel to the incident surface.

2. The illumination apparatus according to claim 1, wherein
   the light source comprises a light emitting element that emits a wavelength of an infrared region.

3. The illumination apparatus according to claim 1, wherein
   the light source includes a light emitting element that emits a wavelength of an ultraviolet region.

4. An image sensor unit comprising:
   a light source comprising a plurality of light emitting elements that emit light at different wavelengths;
   a rod-like light guide that shapes the light emitted by the light source into a line;
   a light condenser that condenses light from an illuminated body; and
   an image sensor that receives reflected light condensed by the light condenser to convert the reflected light to an electric signal, wherein
   the light source is arranged at one end of the light guide in a longitudinal direction, adjacent an incident surface, and
   a reflection surface provided with a reflection material having reflectance differences for the light at different wavelengths is formed on the other end of the light guide in the longitudinal direction, the reflection surface being arranged parallel to the incident surface.

5. The image sensor unit according to claim 4, wherein
   the light source comprises a light emitting element that emits a wavelength of an infrared region.

6. The image sensor unit according to claim 4, wherein
   the light source includes a light emitting element that emits a wavelength of an ultraviolet region.

7. A paper sheet distinguishing apparatus that reads light from an illuminated body while relatively moving an image sensor unit and the illuminated body, wherein
   the image sensor unit comprises:
   a light source comprising a plurality of light emitting elements that emit light at different wavelengths;
   a rod-like light guide that shapes the light emitted by the light source into a line;
   a light condenser that condenses light from an illuminated body; and
   an image sensor that receives reflected light condensed by the light condenser to convert the reflected light to an electric signal, wherein
   the light source is arranged at one end of the light guide in a longitudinal direction, adjacent an incident surface,
   a reflection surface provided with a reflection material having reflectance differences for the light at different wavelengths is formed on the other end of the light guide in the longitudinal direction, the reflection surface being arranged parallel to the incident surface.

8. The paper sheet distinguishing apparatus according to claim 7, wherein
   the light source comprises a light emitting element that emits a wavelength of an infrared region.

9. The paper sheet distinguishing apparatus according to claim 7, wherein
   the light source includes a light emitting element that emits a wavelength of an ultraviolet region.

10. The illumination apparatus according to claim 1, wherein
the light guide includes a diffusing surface the extends in the longitudinal direction away from the incident surface, and
the diffusing surface light guide is made of a material having transmittance that is not constant for the light at different wavelengths emitted by the light source with an increase in the distance from the incident surface.

11. The illumination apparatus according to claim 1, wherein
the reflection surface reflects the light to the one end of the light guide in the longitudinal direction.

12. The illumination apparatus according to claim 1, wherein
the reflection material is a paint.

13. The illumination apparatus according to claim 1, wherein
the reflection material reflects or absorbs the light.

14. The image sensor unit according to claim 4, wherein
the light guide includes a diffusing surface the extends in the longitudinal direction away from the incident surface, and
the diffusing surface light guide is made of a material having transmittance that is not constant for the light at different wavelengths emitted by the light source with an increase in the distance from the incident surface.

15. The image sensor unit according to claim 4, wherein
the reflection surface reflects the light to the one end of the light guide in the longitudinal direction.

16. The image sensor unit according to claim 4, wherein
the reflection material is a paint.

17. The image sensor unit according to claim 4, wherein
the reflection material reflects or absorbs the light.

18. The paper sheet distinguishing apparatus according to claim 7, wherein
the light guide includes a diffusing surface the extends in the longitudinal direction away from the incident surface, and
the diffusing surface light guide is made of a material having transmittance that is not constant for the light at different wavelengths emitted by the light source with an increase in the distance from the incident surface.

19. The paper sheet distinguishing apparatus according to claim 7, wherein
the reflection surface reflects the light to the one end of the light guide in the longitudinal direction.

20. The paper sheet distinguishing apparatus according to claim 7, wherein
the reflection material is a paint.

21. The paper sheet distinguishing apparatus according to claim 7, wherein
the reflection material reflects or absorbs the light.

* * * * *